United States Patent [19]

Gillespie

[11] Patent Number: 5,168,538
[45] Date of Patent: Dec. 1, 1992

[54] OPTICAL PROBE EMPLOYING AN IMPEDANCE MATCHED SUB-LAMBDA TRANSMISSION LINE

[76] Inventor: Donald E. Gillespie, 4629 Platt Rd., Ann Arbor, Mich. 48108

[21] Appl. No.: 642,041

[22] Filed: Jan. 16, 1991

[51] Int. Cl.$^5$ ................................................ G02B 6/10
[52] U.S. Cl. .................................... 385/123; 385/43; 385/142; 385/902; 250/504 H
[58] Field of Search ......................... 350/96.15, 96.29; 250/504 R, 504 H, 216; 385/123, 133, 95, 902, 39, 43, 142

[56] References Cited

U.S. PATENT DOCUMENTS

| | | | |
|---|---|---|---|
| 4,604,520 | 8/1986 | Pohl | 250/216 |
| 4,725,727 | 2/1988 | Harper et al. | 250/227.29 X |
| 4,913,507 | 4/1990 | Stamnitz et al. | 350/96.29 X |
| 4,917,462 | 4/1990 | Lewis et al. | 250/216 X |

Primary Examiner—John D. Lee
Assistant Examiner—Stephen W. Barns
Attorney, Agent, or Firm—Krass & Young

[57] ABSTRACT

The present invention is an optical probe for emission of light from a region smaller than a wavelength. The optical probe includes a transmission line fed by an optic fiber and an impedance matched coupling. In a first embodiment the optical probe ends with a surface-wave transmission line including a central conductor and a coaxial dielectric. The diameter of the central conductor at the optic fiber is selected to substantially match the transmission impedance of the surface-wave transmission line to that of the optic fiber. The diameter of the central conductor decreases to a diameter smaller than the use wavelength at the tip end. The far end of the dielectric preferably includes a concavity to shape the resulting electric fields. In an alternative embodiment, the optical probe includes a coaxial transmisson line. The optic fiber includes a section having a decreasing diameter outer cladding and a section having no outer cladding. The coaxial transmission line includes a central conductor and a dielectric having a diameter substantially equal to the diameter of the core. An outer conductive layer is concentric with the two sections of the optic fiber and the dielectric. In a further alternative embodiment the impedance matched coupling includes a resonant cavity tunable to minimize the voltage standing wave ratio in the optic fiber.

21 Claims, 2 Drawing Sheets

OPTICAL PROBE EMPLOYING AN IMPEDANCE MATCHED SUB-LAMBDA TRANSMISSION LINE

TECHNICAL FIELD OF THE INVENTION

The technical field of the present invention is that of light transmission and particularly light transmission techniques achieving a spot having dimensions less than the diffraction limit of the wavelength.

BACKGROUND OF THE INVENTION

There are a number of fields where a very small spot of light is required. Near field scanning optical microscopes are one such field. Near field scanning optical microscopes generally employ light passing through an aperture smaller than the wave length to illuminate an object located in the near field of the aperture. This light source is scanned to form a complete picture of the target. The availability of light in the near field permits resolution of features smaller than that a wavelength. The reflections from a small scanned spot of light permit detection of very small features. This solves a dilemma of ordinary optical techniques that finer resolution requires shorter wave. Optical recording techniques typically employ reflections or refractions of very small spots of light for recording and detection. Higher storage densities can be achieved if the smaller spots possible using near fields are employed.

There are practical limits to the amount of light available using prior art near field techniques. The smallest spot size which can be produced by a conventional optical systems using a fast lens is limited by diffraction effects. In a conventional optical system the smallest spot size which can be produced that contains appreciable energy has a diameter of one quarter wavelength. Other techniques must be used to achieve smaller spot sizes containing appreciable light energy. A typical technique involves manufacture of a glass micropipet having an outlet smaller in diameter than the wavelength. The micropipet is coated on the inside with a reflective material to contain and direct light inserted into the micropipet. Light is coupled to this structure via an optic fiber. This techniques involves very high attenuations, perhaps only one ten-thousandth of the light entering the micropipet emerges from the opening. In addition the attenuation goes up as the size of the aperture decreases, thus finer resolutions involve greater loses. Near field scanning optical microscopes require detection of light reflected from the scanned object, thus suffering two such attenuations. This places a practical limit on the resolutions achievable using the prior art.

The prior art teaches two techniques for producing adequate light intensity. The first technique involves using very great input light intensities. This achieves acceptable reflected intensities in spite of the attenuations. A second technique employs anthracene crystals grown in the end of the micropipet. When excited with ultraviolet light, the anthracene fluoresces producing an excited wave which is coupled to the aperture and produces near field light there. This technique is believed to produce light intensities up to three times as great as the micropipet alone. While anthracene fluorescence can produce somewhat higher light intensities, this technique cannot be used in the applications, such as near field scanning microscopes, that require detection of reflected light.

Thus it would be advantageous in the art to provide an optical probe able to produce a near field sub-diffraction limit spot of light with greater delivery and necessary efficiencies than currently known.

SUMMARY OF THE INVENTION

The purpose of the invention is to delivery light to a spot on an optical recording medium or other subject that is very much smaller than can be produced by a fast focusing system of conventional design. Rather than use a focusing system to delivery energy to the work piece, this invention uses an optical transmission line. The applicant has recognized, contrary to the expectations of those knowledgeable in the art, that electromagnetic energy at optical wavelengths can propagate in a surface-wave or coaxial transmission line. This transmission line carries the energy in a conduit that is very small in relation to the wavelength and delivers the energy from the conduit to the work piece in the near field by direct capacitive and/or electromagnetic coupling.

This invention sends light down a transmission line that has physical dimensions very much smaller than the free space wavelength of the waves. This is in the same manner that radio waves having a wavelength of hundreds or even thousands of meters can be sent efficiently along a transmission line only a centimeter or less in diameter; as for example between a radio transmitter and its distant antenna. This realization by the applicant that electromagnetic energy at optical wavelengths can travel on a transmission line which is smaller in dimensions that the wavelength permits production of a sub-lambda near field light spot.

This application is limited to those types of transmission lines that do not have an intrinsic physical dimensional requirement related to the propagated wavelength in order for them to work effectively. Some transmission lines have a "cut off" in their transmission characteristic related to wavelength. Examples of transmission lines exhibiting cut-off are the common rectangular or cylindrical tubular waveguide used in radar and microwave communication system and the common optical fiber.

This application is limited to those transmission line systems which in theory have an unlimited frequency conducting capability and are characterized by having two conductors or the virtual appearance of two conductors. Further, while not excluding in application these systems of two wires that are not coaxial, this present description is limited to transmission lines that are coaxial or axially symmetrical. This narrows the discussion to two transmission line systems: the coaxial cable; and the surface wave conductor.

In the preferred embodiment of the present invention light is delivered to the transmission line via a conventional optic fiber. An impedance matched coupling transmits the light from the optic fiber to the transmission line. This impedance matched coupling insures relatively loss-less bidirectional coupling between the optic fiber and the transmission line. The transmission line gradually reduces in size until it is smaller than the smallest spot size obtainable using conventional optics.

In a first embodiment the optical probe ends with an impedance matched surface-wave transmission line. This surface-wave transmission line includes a central conductor and an outer or coaxial dielectric. The first end of the central conductor abuts the central portion of the end of the core of the optic fiber. The diameter of the central conductor at this end is selected from the range between zero and the diameter of the core in order to substantially match the transmission impedance of the surface-wave transmission line to that of the optic fiber. This central conductor diameter decreases from the impedance matching diameter at the optic fiber to a diameter smaller than the diffraction limit of use wavelength at the opposite end. This decreasing diameter preferably consists of an exponential taper or a two stage exponential taper.

The coaxial dielectric has a diameter decreasing from the diameter of the optic fiber to a diameter that may also be smaller that the wavelength. The ratio of the diameter of the central conductor to the diameter of the dielectric may be maintained substantially constant throughout their length or may gradually change.

The second end of the central conductor extends beyond the dielectric. Light is emitted from this end of the optical probe by spilling of the electric and magnetic fields transmitted via the surface-wave transmission line. The second end of the dielectric preferably includes a concavity. This concavity serves to shape the resulting electric fields to provide a reduced spot size.

The length of the surface-wave transmission line from the optic fiber to the tip is selected in the range of 100 to 1000 times the use wavelength.

In an alternative embodiment, the optical probe includes a coaxial transmission line. The optic fiber is formed in three sections. The first section is an ordinary optic fiber construction in which the outer cladding has a substantially constant diameter. The second section has an outer cladding diameter decreasing from the diameter of the first section to zero. The length of this section of optic fiber is approximately 1000 times the use wavelength. The third section has no outer cladding. The length of this third section is in the range of 100 to 1000 times said predetermined wavelength. The coaxial transmission line includes a central conductor and a dielectric formed as before except that the diameter of the dielectric decreases from a diameter substantially equal to the diameter of the core. An outer conductive layer concentric with the first, second and third sections of the optic fiber and the dielectric completes the structure. The far end of the central conductor extends beyond the dielectric in the same manner as the surface-wave transmission line. The outer conductive layer preferably includes a ground plane section substantially perpendicular to the central conductor at the far end. The length of the coaxial transmission line is approximately 100 times the use wavelength.

In a yet further embodiment the impedance matched coupling consists of a tuned cavity. Light energy is pumped into the tuned cavity from the optical fiber. The transmission line is also coupled to the tuned cavity. The wavelength of the tuned cavity may be adjusted by small changes in its dimensions. This embodiment is inherently narrowband as opposed to the essential broadband character of the other embodiments.

BRIEF DESCRIPTION OF THE DRAWINGS

These and other objects and aspects of the present invention will become clear from the following description of the invention, in which.

DETAILED DESCRIPTION OF THE PREFERRED EMBODIMENTS

The present invention operates by efficient coupling of light from an ordinary optic fiber to a transmission line. This coupling takes place in a manner which substantially matches the impedances of the transmission line to that of the optic fiber. This substantial impedance match permits much more light to be coupled to the transmission line than would ordinarily be expected. The transmission line is capable of reasonably efficient light transmission while employing physical dimensions smaller than a wavelength. The transmission line ends in a light termination which can be much smaller than the use wavelength. This structure lends itself to two way coupling of near field light spots with losses which are much less than those experienced in the prior art structures.

The transmission line, whether a coaxial cable or a surface wave conductor, may have an arbitrarily large diameter at one end and an arbitrarily small diameter at the other. The transmission line $Z_o$ of a surface wave conductor is principally dependent on the ratio of the diameter of the center conductor and the diameter of the dielectric surrounding it. The transmission impedance $Z_o$ of the line may also differ from one end of the line to the other depending upon requirements. The transmission line $Z_o$ of a coaxial cable is principally dependent on the ratio of the diameters of the inner conductor and the inside diameter of the outer conductor. In each case, each of these parameters can be varied to suit the demands of diameter and transmission impedance $Z_o$ at either end of the line. However, it is extremely important to note the diameters of a constant impedance transmission line must be changed slowly over many wavelengths if a broadband or low voltage standing wave ratio is to be maintained during the transformation of size. Similarly, the important ratios of diameters must be changed slowly over many wavelengths if a low voltage standing wave ratio is to be maintained during transformation of transmission impedance $Z_o$.

If these constraints are followed a transmission line can be built using either coaxial or surface wave conduction that can, for example, match the physical size and characteristic impedance of a common optical fiber waveguide and then be transformed in size and transmission impedance $Z_o$ over many wavelengths to meet the physical spot size and characteristic impedance required at the work piece.

Figure 1:
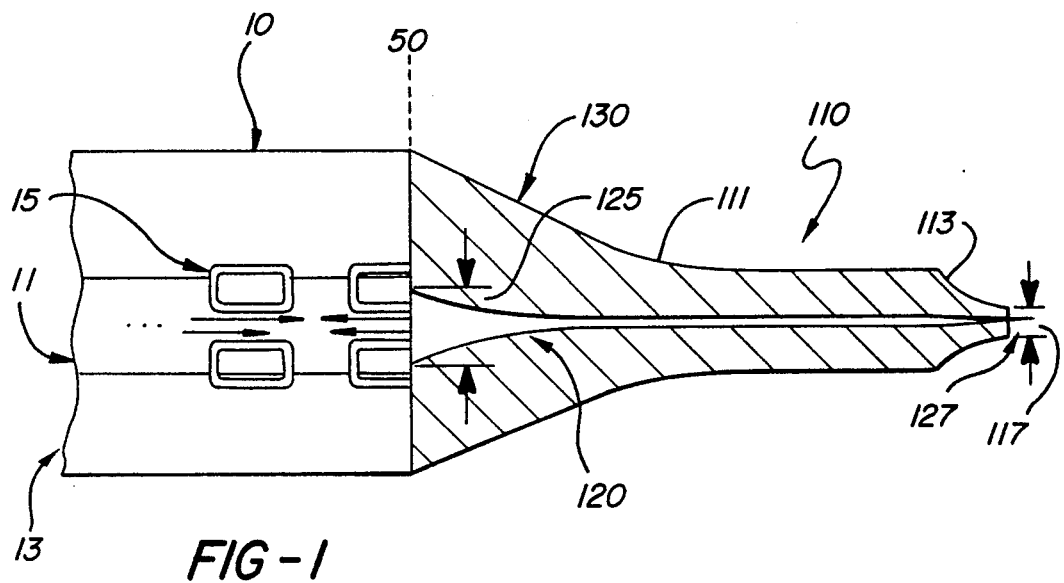
FIG. 1 illustrates a cross section of an optical probe according to a first embodiment of the present invention.

FIG. 1 illustrates a first embodiment of the present invention in cross section. Optical probe 100 includes optic fiber 10 and surface-wave transmission line 110. Light is transmitted via an ordinary optic fiber 10 which includes core 11 having a first index of refraction and clad 13 having a second, lower index of refraction. In accordance with the known art, light traveling through optic fiber 10 is substantially contained within core 11 due to internal reflections. This light within optic fiber 10 is preferably of a relatively narrow bandwidth such as obtained from a laser source.

As illustrated in FIG. 1, the light transmitted within optic fiber 10 is traveling in the axial E-field mode $TM_{01}$. These axial electrical fields are illustrated at 15.

The normal transmission mode in such an optic fiber is a transverse electric field mode called the $TE_{11}$ mode. It is known in the art to convert this normal transmission mode to the axial E-field mode $TM_{01}$ by turning optic fiber 10 in a bend. Such a bend in optic fiber 10 causes some of the propagated light to convert to the axial E-field mode.

Light from optic fiber 10 is coupled to surface-wave transmission line 110 at interface 50. Surface-wave transmission lines for microwave wavelengths are described in "Designing Surface-Wave Transmission Lines" by Georg Goubau, *Electronics* volume 27, April 1954, pages 180 to 184. Surface-wave transmission line 110 includes central conductor 120 and dielectric 130.

Central conductor 120 abuts the central portion of core 11. The diameter 125 of central conductor 120 at interface 50 is selected to match the impedance of surface-wave transmission line 110 to that of optic fiber 10. Note that this diameter 125 is less than the diameter of core 11 and greater than zero. If diameter 125 of central conductor 120 were equal to the diameter of core 11, this would constitute a short circuit and thus a very low impedance. If diameter 125 of central conductor 120 were vanishingly small, this would constitute a substantially open circuit and thus a very high impedance. With proper selection of diameter 125 an intermediate impedance which matches the impedance of optic fiber 10 can be achieved. This impedance selection is important in minimizing losses across interface 50.

Surface-wave transmission line 110 includes two tapered sections 111 and 113. Within tapered section 111 both central conductor 120 and dielectric 130 taper exponentially with distance from interface 50. Both central conductor 120 and dielectric 130 taper exponentially with a differing and steeper slope within tapered section 113. The ratio of the diameter of central conductor 120 to the diameter of dielectric 130 is preferably substantially constant along their length. The characteristic impedance of surface-wave transmission line 110 is based on the ratio of the diameter of central conductor 120 to the diameter of dielectric 130. Tapered sections 111 and 113 maintain this ratio throughout their length and thus maintain the same characteristic impedance. Alternately, this ratio may be gradually changed over the length of the tapered sections. The taper of tapered sections 111 and 113 thus may act as an extended transformer gradually changing the impedance of the transmission line with no abrupt changes and little loss. This permits a desired impedance to be achieved at tip 127.

Surface-wave transmission line 110 ends at tip 127 with central conductor 120 extending beyond dielectric 130. The diameter 117 of the surface-wave transmission line 110 near tip 127 is preferably less than the wavelength of the light transmitted by optic fiber 10. The sub-lambda diameter 117 of tip 127 ensures a sub lambda near field light spot at tip 127. The total length of surface-wave transmission line 110 from interface 50 to tip 127 is preferably between 100 and 1000 times the wavelength.

Figure 2:
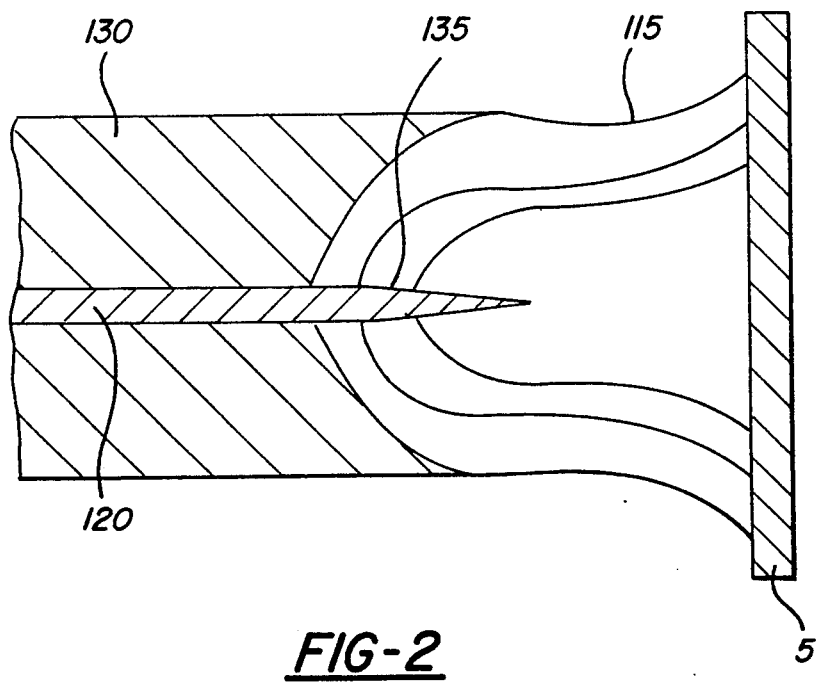
FIG. 2 illustrates a detail of the tip of the optical probe illustrated in FIG. 1.

FIG. 2 illustrates a detailed view of tip 127 in accordance with the preferred embodiment. Dielectric 130 includes a concavity 135 at the tip. Electric field lines 115 emerge from tip 127 onto object 5. In accordance with the known art, these electric field lines are perpendicular to the surface of central conductor 120. Light is thus emitted from tip 127 due to the spilling of the constituent electrical and magnetic fields from the transmission line. Note that the distance to object 5 is sufficiently small as to be in the near field of the emitted light. Concavity 135 in dielectric 130 serves to shape the electric fields to provide a smaller focussed spot on object 5. Light existing near tip 127, such as light emitted from tip 127 and reflected back by object 5, would be coupled into the transmission line in a reciprocal manner.

The losses in surface-wave transmission line 110 are very modest when compared with prior art techniques. In addition surface-wave transmission line 110 is relatively simple to manufacture. In the preferred embodiment central conductor 120 is constructed as follows. A narrow glass pipe is heated at in the middle and pulled in the same manner as in the construction of a micropipet. Each half of this structure forms a mold in the shape desired because this process results in a substantially exponential taper. Molten metal is poured into the mold. With proper selection of the glass type, the glass itself may serve as dielectric 130. Otherwise the glass mold is removed and a dielectric is deposited over central conductor 120 such as by dipping in liquid material.

It is desirable that surface-wave transmission line 110 operate in the same manner as the surface-wave transmission lines described in the Goubau article used for radio frequency transmission. In order to avoid quantum mechanical effects, the photon energy must differ from the conductor band gap energy. In many commonly used conductors, such as copper, silver or gold, the band gap corresponds to photon energies in the blue and ultraviolet ranges. Thus there will be considerable choice of conductors for many optical wavelengths. In addition, it should be feasible to operate even in the near ultraviolet region with proper selection of the conductor material.

An all dielectric or conventional light fiber transmits electromagnetic energy not only through the core but also as an evanescent wave in the cladding close to the core. One manner to transition from a dielectric clad waveguide to a dielectrically loaded metallic coax is by gradually tapering the cladding of the optical fiber until only the core remains. A section of the cladding, the tapered section of the cladding and the core, are then plated with, for example, aluminum, silver or gold. The result is a dielectric waveguide that, through many wavelengths, becomes a dielectrically loaded metallic waveguide. This metallic clad glass fiber which functions well below the cut off wavelength, $\lambda_c$, may be cleaved normal to the axis of propagation and a metal-dielectric-metal coaxial cable of appropriate physical dimensions may then be coupled directly to it.

Figure 3:
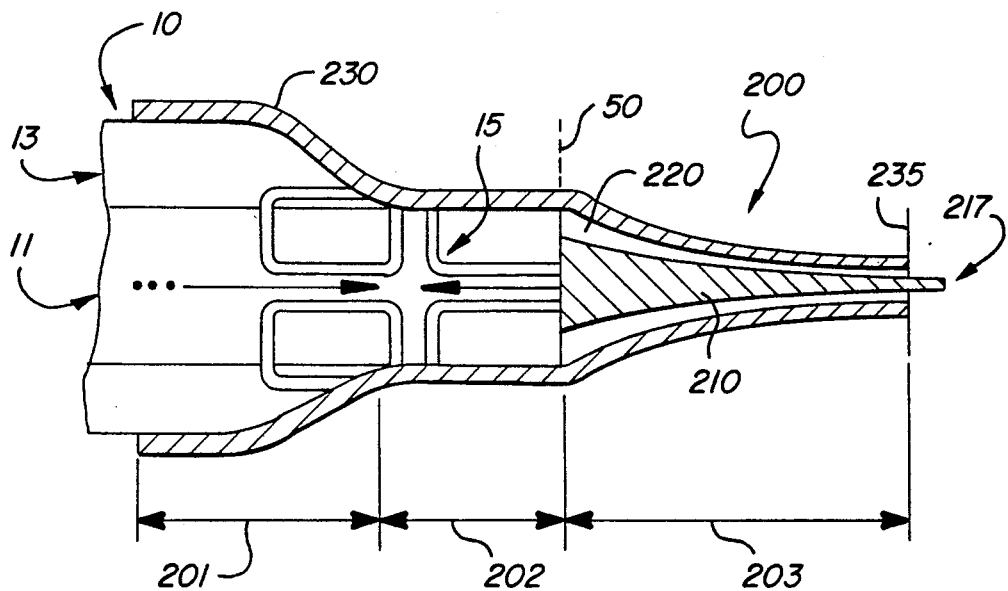
FIG. 3 illustrates a cross section of a second embodiment of the present invention.

FIG. 3 illustrates in cross section this alternative embodiment of the present invention. Optical probe 200 provides an interface between an optic fiber and a coaxial transmission line. Optical probe 200 includes optic fiber 10 and three sections 201, 202 and 203. Each of the three sections 201, 202 and 203 includes an outer conductive layer 230. These three sections are coupled together and further coupled to optic fiber 10.

First section 201 is directly coupled to optic fiber 10. Within first section 201 the diameter of outer cladding 13 is reduced from its normal diameter at a first end to zero at a second end. This reduction in diameter is preferably over a length of approximately 1000 times the wavelength. This reduction in diameter is preferably in the form of a exponential taper.

Second section 202 is coupled to the second end of first section 201. Second section 202 consists of a length of core 11 of optic fiber 10 surrounded by outer conductive layer 230. This section preferably has a length of between 100 and 1000 times the wavelength.

Third section 203 consists of a coaxial transmission line for transmission light. Third section 230 consists of central conductor 210, dielectric 220 and outer conductive layer 230. Central conductor 210 has a first end in contact with the cut end of core 11 and a second end of a reduced diameter less than the use wavelength. This diameter is preferably reduced in an exponential taper. The diameter of central conductor 210 at the end of core 11 is preferably selected in the manner noted above to match the transmission impedance across interface 50. Dielectric 220 surrounds central conductor 210 and preferably has a proportional exponential taper. Lastly, the combination is enveloped by outer conductive layer 230 forming a coaxial transmission line. Outer conductive layer 230 includes a ground plane section 235 near the tip perpendicular to central conductor 210. Ground plane section 235 serves to shape the electric field at the tip in order to provide a better focussed spot. The length of section 230 is preferably approximately 100 times the wavelength. The characteristic impedance of coaxial transmission line 203 is based on the ratio of the outer diameter of central conductor 210 to the inner diameter of outer conductive layer 230 and the dielectric constant of dielectric 220. If the same dielectric is used throughout, then coaxial transmission line 203 may taper with a constant diameter ratio, thus maintaining a constant characteristic impedance. Alternately, the diameter ratio may gradually change over the length of coaxial transmission line 203, thereby gradually changing the impedance to that desired at tip 217.

Optical probe 200 is constructed as follows. A length of optic fiber 10 is cut. The outer cladding 13 is stripped from a portion of between 100 and 1000 times the wavelength for section 202. Next the outer cladding 13 is partly stripped in order to form the region of changing diameter of section 201. The central conductor 210 and dielectric 220 are attached in the manner of the embodiment of FIG. 1. Lastly the outer conductive layer 230 is applied. This could be by insertion of tip 217 into ground plane 235 and deposition of a conductor forming outer conductive layer 230.

The above described embodiments will be very effective from the point of view of broadband wavelength matching with low voltage standing wave ratios. They will also have a low insertion loss compared to the present method of sending the light down a tapered hollow metallic cone which transitions to a waveguide well beyond cutoff. However, they may be difficult to produce in commercial quantities and they may not have the lowest possible insertion loss.

Figure 4:
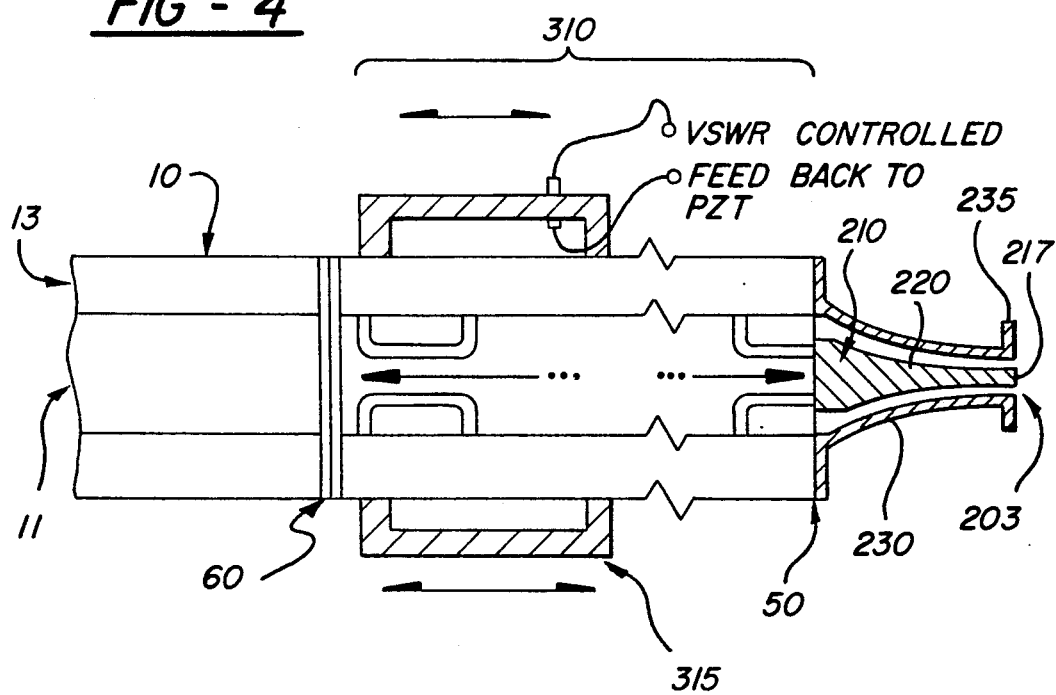
FIG. 4 illustrates a cross section of a yet further embodiment of the present invention.

FIG. 4 illustrates a further embodiment of the present invention employing a resonant cavity 310. Energy is fed into resonant cavity 310 from optic fiber 10 via partial reflector 60, which partially transmits and partially reflects light in either direction. Resonant cavity 310 is a section of optic fiber having a length many times the wavelength of light used. Piezoelectric element 315 is cemented to resonant cavity 310. Application of a voltage across piezoelectric element 315 causes changes in its length which change the length of resonant cavity 310. This serves to tune the resonance of resonant cavity 310. FIG. 4 illustrates a coupling of resonance cavity 310 to a coaxial transmission line 203 via interface 50, which is similar to interface 50 illustrated in FIG. 3. The percentage of transmission at partial reflector 60 and diameter of central conductor 210 are selected for maximum energy transfer from optic fiber 10 to coaxial transmission line 203. Thereafter resonant cavity 310 is tuned to achieve the minimum voltage standing wave ratio. This results when the impedance of resonant cavity 310 at partial reflector 60 best matches the characteristic impedance of optic fiber 10. As illustrated in FIG. 4, this embodiment proposes that the voltage standing wave ratio within optic fiber 10 be measured to produce an error signal for control of piezoelectric element 315. This results in active stabilization of the resonance of resonant cavity 310.

There are a number of possible variations of the embodiment of FIG. 4. First, although FIG. 4 illustrates a coaxial transmission line such as previously shown in FIG. 3, this embodiment may also employ a surface-wave transmission line such as illustrated in FIG. 1. In that case the coupling between resonant cavity 310 and the surface-wave transmission line would be substantially as illustrated in FIG. 1. Second, there are many ways to tune resonant cavity 310. Any manner of changing the dimensions of resonant cavity 310 will change its resonance wavelength. The resonance of resonant cavity 310 may also be changed by changing its effective length by changing its electrical properties. Further, stub tuners, which are well known in the microwave art, may also be employed. The essential feature is that the resonance of resonant cavity 310 is changeable to produce a minimal voltage standing wave ratio in optic fiber 10. Note that the presence of resonant cavity 310 makes this embodiment inherently narrow band.

The embodiment illustrated in FIG. 4 is better suited to construction by lithography than the previously described embodiments. Thus the embodiment of FIG. 4 may be manufactured in volume at lower cost. Further, this embodiment permits optimal impedance matching for the coupling by tuning resonant cavity 310.

The applicant believes that recognition that electromagnetic energy at optical wavelengths can propagate via a transmission line is key to this invention. Once this concept is accepted, it is clear that the diameter of the transmission line may be made smaller than the wavelength. The production of a sub lambda near field light spot by direct capacitive or electromagnetic coupling results from a termination of such a sub-lambda transmission line. This application teaches the construction and excitation of such transmission lines. On the other hand, it is counter to the expectations of those skilled in the art that light can travel down a wire. Therefore this invention because it is contrary to the belief of those skilled in the art.

The previous discussion has focused on the production of a spot of light smaller than the diffraction limit of conventional optics. The described embodiments are fully reciprocal, that is they are capable of receiving light from spots of the same small size. This capability of reciprocity permits the optical probes of this invention to be used in scanning optical microscopes or read/write optical recordings which require bidirectional light transmission. In order to obtain the benefit of the small spot size in these applications, the optical probe must be coupled to the work piece in the near field, that is there must be less than one wavelength between the optical probe and the work piece.

I claim:

1. An optical probe comprising:

an optic fiber including a central core and an outer cladding, said optical fiber capable of transmitting light of a predetermined band of wavelengths;

a transmission line of the type having no inherent wavelength cutoff, said transmission line having a central metallic conductor, a first end with a diameter approximately the diameter of said optic fiber and large in relation with any wavelength of the predetermined band of wavelengths, and a second end with a diameter small in relation to the shortest wavelength of said predetermined band of wavelengths; and an impedance matched coupling connected to said optic fiber and said transmission line for providing a substantially matched impedance bidirectional light transmission between said optic fiber and said first end of said transmission line.

2. The optical probe as claimed in claim 1, wherein:

said optic fiber is capable of transmitting light of said predetermined band of wavelengths in the axial electrical field mode;

said transmission line consists of a surface-wave transmission line including said central conductor and a dielectric coaxial with said central conductor, the respective diameters of said central conductor and said dielectric decreasing from said first end to said second end of said transmission line; and said impedance matched coupling includes an end of said optic fiber cut substantially perpendicular to its length, and said central conductor of said transmission line having a first end abutting a central portion of said end of said central core of said optic fiber, said central conductor having a diameter selected from the range between zero and the diameter of said central core at said end in order to substantially match the transmission impedance of said transmission line to the transmission impedance of said optic fiber.

3. The optical probe as claimed in claim 2, wherein: the ratio of the diameter of said central conductor to the diameter of said dielectric is substantially constant from said first end to said second end, thereby maintaining a substantially constant transmission impedance.

4. The optical probe as claimed in claim 2, wherein: the ratio of the diameter of said central conductor to the diameter of said dielectric gradually changes from said first end to said second end, the change in said ratio of the diameter of said central conductor to the diameter of said dielectric being small within a distance of said shortest wavelength of said predetermined band of wavelengths, thereby achieving a desired transmission impedance at said second end.

5. The optical probe as claimed in claim 2, wherein: said central conductor extends beyond said dielectric at said second end of said transmission line; and said dielectric includes a concavity at said second end of said transmission line.

6. The optical probe as claimed in claim 2, wherein: the length of said transmission line from said first end to said second end is selected in the range of 100 to 1000 times the wavelength of said predetermined band of wavelengths.

7. The optical probe as claimed in claim 1, wherein:

said optic fiber is capable of transmitting light of said predetermined band of wavelengths in the axial electrical field mode;

said transmission line consists of a coaxial transmission line including said central conductor, a dielectric coaxial with said central conductor and a first outer conductive layer coaxial with said central conductor and said dielectric, the respective diameters of said central conductor, said dielectric and said first outer conductive layer decreasing from said first end to said second end of said transmission line; and said impedance matched coupling includes a first optic fiber region including a central core, an outer cladding and a second outer conductive layer covering said outer cladding, said first optic fiber region having a first end wherein said central core and said outer cladding are substantially contiguous with said central core and said outer cladding of said optic fiber, said outer cladding diameter decreasing from the diameter of said outer cladding of said optic fiber at said first end to zero at a second end opposite said first end, a second optic fiber region including a central core and a third outer conductive layer covering said central core, said second optic fiber region having a first end wherein said central core is substantially contiguous with said central core at said second end of said first optic fiber region and said third outer conductive layer is substantially contiguous with and electrically connected to said second outer conductive layer at said second end of said first optic fiber region and having said a second end terminating in an end cut substantially perpendicular to its length, said first outer conductive layer at said first end of said transmission line is substantially contiguous with and electrically connected to said third outer conductive layer at said second end of said second optic fiber region, and said central conductor of said transmission line at said first end of said transmission line abutting a central portion of said second end of said central core of said second optic fiber region, said central conductor having a diameter selected from the range between zero and the diameter of said central core of said second optic fiber region at said second end in order to substantially match the transmission impedance of said transmission line to the transmission impedance of said optic fiber.

8. The optical probe as claimed in claim 7, wherein: the ratio of the diameter of said central conductor to the inner diameter of said first outer conductive layer is substantially constant from said first end to said second end, thereby maintaining a substantially constant transmission impedance.

9. The optical probe as claimed in claim 7, wherein: the ratio of the diameter of said central conductor to the inner diameter of said first outer conductive layer gradually changes from said first end to said second end, the change in said ratio of the diameter of said central conductor to the inner diameter of said first outer conductive layer being small within a distance of said shortest wavelength of said predetermined band of wavelengths, thereby achieving a desired transmission impedance at said second end.

10. The optical probe as claimed in claim 7, wherein:
said second end of said central conductor of said transmission line extends beyond said second end of said dielectric of said transmission line; and
said first outer conductive layer includes a ground plane section disposed substantially perpendicular to said central conductor at said second end of said transmission line.

11. The optical probe as claimed in claim 7, wherein:
the length of said first optic fiber region of said impedance matched coupling from said first end to said second end is approximately 1000 times the wavelength of said predetermined band of wavelengths;
the length of said second optic fiber region of said impedance matched coupling from said first end to said second end is selected in the range of 100 to 1000 times the wavelength of said predetermined band of wavelengths; and
the length of said transmission line from said first end to said second end is approximately 100 times the wavelength of said predetermined band of wavelengths.

12. The optical probe as claimed in claim 1, wherein:
said impedance matched coupling includes
an end of said optic fiber cut substantially perpendicular to its length,
a partially reflecting, partially transmitting mirror having a first surface abutting said end of said optic fiber and a second end, and
a resonant cavity having a first end abutting said second surface of said partially reflecting, partially transmitting mirror, a second end abutting said first end of said transmission line, and a tuning means for altering the resonance wavelength of light within said resonant cavity to substantially match the impedance of light transmission between said optic fiber and said transmission line.

13. The optical probe as claimed in claim 12, wherein:
said tuning means includes a piezoelectric element mechanically coupled to said resonant cavity for changing the dimensions of said resonant cavity under electrical excitation.

14. The optical probe as claimed in claim 12, wherein:
said tuning means includes further includes a means for measuring the voltage standing wave ratio of said optic fiber at a location remote from said impedance matched coupling, said tuning means altering the resonance wavelength of light within said resonant cavity to minimize said measured voltage standing wave ratio of said optic fiber.

15. The optical probe as claimed in claim 12, wherein:
said resonant cavity includes a optic fiber region having a central core and an outer cladding substantially the same size as said central conductor and outer cladding, respectively, of said optic fiber; and
said transmission line consists of a coaxial transmission line including said central conductor, a dielectric coaxial with said central conductor and an outer conductive layer coaxial with said central conductor and said dielectric, the respective diameters of said central conductor, said dielectric and said outer conductive layer decreasing from said first end to said second end of said transmission line.

16. The optical probe as claimed in claim 12, wherein:
said resonant cavity includes a optic fiber region having a central core and an outer cladding substantially the same size as said central conductor and outer cladding, respectively, of said optic fiber; and
said transmission line consists of a surface-wave transmission line including said central conductor and a dielectric coaxial with said central conductor, the respective diameters of said central conductor and said dielectric decreasing from said first end to said second end of said transmission line.

17. An optical probe comprising:
an optic fiber including a central core and an outer cladding, said optic fiber capable of transmitting light of a predetermined wavelength in the axial electrical field mode and terminating in an end cut substantially perpendicular to its length;
a central conductor having a first end abutting a central portion of the end of said central core of said optic fiber, said central conductor having a diameter decreasing from a predetermined diameter at said first end to a diameter smaller that said predetermined wavelength at a second end opposite said first end; and
a dielectric coaxial with said central conductor having a diameter decreasing from a diameter substantially equal to the diameter of said optic fiber at a first end corresponding to said first end of said central conductor to a diameter smaller that said predetermined wavelength at a second end opposite said first end;
wherein said predetermined diameter of said first end of said central conductor is selected from the range of zero to the diameter of said central core at said end in order to substantially match the transmission impedance of the combination of said central conductor and said dielectric to the transmission impedance of said optic fiber.

18. An optical probe comprising:
an optic fiber including a central core and an outer cladding, said optic fiber capable of transmitting light of a predetermined wavelength in the axial electrical field mode and including
a first region in which said outer cladding has a substantially constant diameter,
a second region having a first end abutting said first region and having a outer cladding diameter decreasing from said predetermined diameter at said first end to zero at a second end opposite said first end, and
a third region having a first end abutting said second end of said second region and a second end terminating in an end cut substantially perpendicular to its length, said third region having no outer cladding;
a central conductor having a first end abutting a central portion of the end of said central core of said optic fiber, said central conductor having a diameter decreasing from a predetermined diameter at said first end to a diameter smaller that said predetermined wavelength at a second end opposite said first end;
a dielectric coaxial with said central conductor having a diameter decreasing from a diameter substantially equal to the diameter of said central core of said optic fiber at a first end corresponding to said first end of said central conductor to a diameter smaller that said predetermined wavelength at a second end opposite said first end; and an outer conductive layer concentric with said second and third regions of said optic fiber and said dielectric;

wherein said predetermined diameter of said first end of said central conductor is selected from the range of zero to the diameter of said central core at said end in order to substantially match the transmission impedance of the combination of said central conductor, said dielectric and said concentric outer conductive layer to the transmission impedance of said optic fiber.

19. An optical probe for light of a predetermined band of wavelengths comprising:

a transmission line of the type having no inherent wavelength cutoff, said transmission line having a central metallic conductor, a first end with a diameter large in relation with any wavelength of the predetermined band of wavelengths, and a second end with a diameter small in relation to the shortest wavelength of the predetermined band of wavelengths; and means coupled to said first end of said transmission line for exciting electromagnetic waves in said transmission line at optical wavelengths within the predetermined band of wavelengths.

20. The optical probe as claimed in claim 19, wherein:
said transmission line consists of a surface-wave transmission line including said central conductor and a dielectric coaxial with said central conductor, the respective diameters of said central conductor and said dielectric decreasing from said first end to said second end of said transmission line.

21. The optical probe as claimed in claim 19, wherein:
said transmission line consists of a coaxial transmission line including said central conductor, a dielectric coaxial with said central conductor and an outer conductive layer coaxial with said central conductor and said dielectric, the respective diameters of said central conductor, said dielectric and said outer conductive layer decreasing from said first end to said second end of said transmission line.

* * * * *

UNITED STATES PATENT AND TRADEMARK OFFICE
CERTIFICATE OF CORRECTION

PATENT NO. : 5,168,538
DATED : December 1, 1992
INVENTOR(S) : Gillespie

It is certified that error appears in the above-identified patent and that said Letters Patent is hereby corrected as shown below:

Column 2, line 49, delete "these" and insert --those--;

Signed and Sealed this

First Day of February, 1994

Attest:

Attesting Officer

BRUCE LEHMAN
Commissioner of Patents and Trademarks